(12) United States Patent
Mitra et al.

(10) Patent No.: US 9,919,274 B2
(45) Date of Patent: Mar. 20, 2018

(54) CARBON NANOTUBE IMMOBILIZED SUPER-ABSORBING MEMBRANES

(71) Applicant: NEW JERSEY INSTITUTE OF TECHNOLOGY, Newark, NJ (US)

(72) Inventors: Somenath Mitra, Bridgewater, NJ (US); Sagar Roy, Newark, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 45 days.

(21) Appl. No.: 15/265,573

(22) Filed: Sep. 14, 2016

(65) Prior Publication Data

US 2017/0072369 A1    Mar. 16, 2017

Related U.S. Application Data

(60) Provisional application No. 62/283,906, filed on Sep. 15, 2015.

(51) Int. Cl.
*B01D 53/22* (2006.01)
*B01D 69/12* (2006.01)
(Continued)

(52) U.S. Cl.
CPC .............. *B01D 69/12* (2013.01); *B01D 5/00* (2013.01); *B01D 53/268* (2013.01); *B01D 67/0009* (2013.01); *B01D 67/0095* (2013.01); *B01D 69/08* (2013.01); *B01D 69/105* (2013.01); *B01D 69/148* (2013.01); *B01D 71/26* (2013.01);
(Continued)

(58) Field of Classification Search
CPC ............ B01D 67/0009; B01D 2323/36; B01D 71/40; B01D 53/268; B01D 69/12; B01D 2323/02; B01D 71/72; B01D 5/00; B01D 69/08; B01D 71/26; B01D 67/0095; E03B 3/28

See application file for complete search history.

(56) References Cited

U.S. PATENT DOCUMENTS

| 7,017,365 | B2 | 3/2006 | Haas | |
| 8,623,156 | B1 * | 1/2014 | Haines | C06C 15/00 149/108.2 |

(Continued)

OTHER PUBLICATIONS

Sijbesma, H.; Nymeijer, K.; Marwijk, R.; Heijboer, R.; Potreck, J.; Wessling, M. Flue gas dehydration using polymer membranes. J. Membr. Sci. 313, 263-276, 2008.

(Continued)

*Primary Examiner* — Anthony Shumate
(74) *Attorney, Agent, or Firm* — Timothy X. Gibson, Esq.; Gibson & Dernier LLP

(57) ABSTRACT

Carbon nanotube (CNT) immobilized membranes for harvesting pure water from air include CNTs incorporated into a layer of super-absorbing polymer. The super-absorbing polymer may be cast over a porous substrate. The super-absorbing polymer binds strongly to water and generates water clusters while the CNTs are operable to interrupt the specific water-polymer and water-water interactions to generate more free water which permeates more easily through the membrane. Methods of forming the CNT immobilized membranes are provided. The CNT immobilized membranes disclosed herein exhibit improved water vapor extraction efficiency, water vapor removal and mass transfer coefficient.

15 Claims, 12 Drawing Sheets

(51) Int. Cl.
| | |
|---|---|
| B01D 69/08 | (2006.01) |
| B01D 71/26 | (2006.01) |
| B01D 71/72 | (2006.01) |
| B01D 67/00 | (2006.01) |
| B01D 71/40 | (2006.01) |
| B01D 53/26 | (2006.01) |
| B01D 5/00 | (2006.01) |
| B01D 69/10 | (2006.01) |
| B01D 69/14 | (2006.01) |
| C02F 1/00 | (2006.01) |
| E03B 3/28 | (2006.01) |

(52) U.S. Cl.
CPC ............. *B01D 71/40* (2013.01); *B01D 71/72* (2013.01); *C02F 1/00* (2013.01); *B01D 2323/02* (2013.01); *B01D 2323/36* (2013.01); *B01D 2325/12* (2013.01); *E03B 3/28* (2013.01); *Y02A 20/109* (2018.01)

(56) References Cited

U.S. PATENT DOCUMENTS

| | | | | |
|---|---|---|---|---|
| 2003/0098518 | A1* | 5/2003 | Averdung | B01D 67/003 264/10 |
| 2007/0005037 | A1* | 1/2007 | Mansfield | A61F 13/15203 604/385.3 |
| 2009/0001009 | A1* | 1/2009 | Linder | B01D 67/0079 210/243 |
| 2010/0104845 | A1* | 4/2010 | MacLennan | B01D 67/0004 428/221 |
| 2010/0313753 | A1* | 12/2010 | Calis | B01D 39/1623 95/45 |
| 2011/0272354 | A1* | 11/2011 | Mitra | B01D 61/02 210/640 |
| 2012/0088240 | A1* | 4/2012 | Baker | B82Y 15/00 435/6.11 |
| 2013/0015122 | A1* | 1/2013 | Awadh | B82Y 30/00 210/500.21 |
| 2014/0231718 | A1* | 8/2014 | Lin | H01B 1/04 252/503 |
| 2014/0272172 | A1* | 9/2014 | Zhamu | C23C 16/26 427/457 |
| 2015/0096442 | A1* | 4/2015 | Sims | B01D 19/0031 96/4 |
| 2016/0051939 | A1* | 2/2016 | Choi | B01D 69/122 210/500.3 |

OTHER PUBLICATIONS

Ahvenaineni R. New approaches in improving the shelf life of minimally processed fruit and vegetables. Trends in Food Sci. Technol., 7, 179-187, 1996.
Jia, L. et al. An experimental study on vapor condensation of wet flue gas in a plastic heat exchanger. Heat Transfer-Asian Res., 30 (7), 571-580, 2001.
Zurigat, Y.H.; Abu-Arabi, M.K.; Abdul-Wahab, S.A. Air dehumidification by triethylene glycol desiccant in a packed column. Energy Conversion and Management, 45 (1), 141-155, 2004.
Ito, A. Dehumidification of air by a hygroscopic liquid membrane supported on surface of a hydrophobic microporous membrane. J. Membr. Sci., 175 (1), 35-42, 2000.
Zhang, L.Z. Mass diffusion in a hydrophobic membrane humidification/dehumidification process: the effects of membrane characteristics. Sep. Sci.Technol., 41 (8), 1565-1582, 2006.
Wang, K.L. et al., Hollow fiber air drying,. J. Membr. Sci., 72 (3), 231-244, 1992.
Wang, Z.; Chen, T.; Xu, J. Gas and water vapor transport through a series of novel poly(aryl ether sulfone) membranes. Macromolecules, 34 (26), 9015-9022, 2001.

Hengl, N.; Mourgues, A.; Pomier, E.; Belleville, M.P.; Paolucci-Jeanjean, D.; Sanchez, J.; Rios, G. Study of a newmembrane evaporator with a hydrophobic metallic membrane. J. Membr. Sci., 289 (1-2), 169-177, 2007.
Bolto, B.; Hoang, M.; Xie, Z. A review of water recovery by vapour permeation through membranes. Water Research , 46, 259-266, 2012.
Allen, S.M.; Fujii, M.; Stannett, V.; Hopfenberg, H.B.; Williams, J.L. The barrier properties of polyacrylonitrile. J. Membr. Sci., 2, 153-163, 1977.
Metz, S.J.; van de Ven, W.J.C.; Potreck, J.; Mulder, M.H.V.; Wessling, M. Transport of water vapor and inert gas mixtures through highly selective and highly permeable polymer membranes. J. Membr. Sci., 251 (1-2), 29-41, 2005.
Jia, L.; Xu, X.; Zhang, H.; Xu, J. Permeation of nitrogen and water vapor through sulfonated polyetherethersulfone membrane. J. Polym. Sci.: Part B: Polym. Phys.., 35, 2133-2140, 1997.
Barrie, J.A., The transport of water in polymers. Proceedings of the Fourth BOC Priestly Conference, 89-113, 1986.
Zhao, Q.; Majsztrik, P.; Benziger, J. Diffusion and interfacial transport of water in Nafion. J. Phy. Chem. B, 115, 2717-2727, 2011.
Hussain, C. M.; Saridara, C.; Mitra, S. Carbon Nanotubes as Sorbents for the Gas Phase Preconcentration of Semivolatile Organics in a Microtrap. Analyst, 133, 1076-1082, 2008.
Holt, J.K.; Park, H.G.; Wang, Y.; Stadermann, M.; Artyukhin, A.B.; Griporopolous, C.P.; Noy, A.; Bakajin, O. Fast Mass Transport Through Sub-2-Nanometer Carbon Nanotubes. Science, 312, 1034-1037, 2006.
Hummer, G.; Rasaiah, J.C.; Nowortya, J.P. Water conduction through the hydrophobic channel of a carbon nanotube. Nature, 414, 188-190, 2001.
Hinds, B.J.; Chopra, N.; Rantell, T.; Andrews, R.; Gavalas, V.; Bachas, L. Aligned Multiwalled Carbon Nanotube Membranes. Science, 303, 62-65, 2004.
Noy, A.; Park, H.G.; Fornasiero, F.; Holt, J. K.; Grigoropoulos, C. P.; Bakajin, O. Nanofluidics in carbon nanotubes. NanoToday, 2(6), 22-29, 2007.
Chen, H.; Sholl, D.S. Predictions of selectivity and flux for CH4/H2 separations using single walled carbon nanotubes as membranes. J. Membr. Sci., 269, 152-160, 2006.
Sae-Khow, O; Mitra, S. Simultaneous Extraction and Concentration in Carbon Nanotube Immobilized Hollow Fiber Membranes. Anal. Chem., 82 (13), 5561-5567, 2010.
Roy, S.; Ntim, S.A.; Mitra, S.; Sirkar, K.K. Facile fabrication of superior nanofiltration membranes from interfacially polymerized CNT-polymer composites. J.Membr. Sci., 375 (1-2), 81-87, 2011.
Sae-Khow, O; Mitra, S. Carbon Nanotube Immobilized Composite Hollow Fiber Membranes for Pervaporative Removal of Volatile Organics from Water. J. Phys. Chem. C, 114, 16351-16356, 2010.
Bhadra, M.; Roy, S.; Mitra, S. Enhanced desalination using carboxylated carbon nanotube immobilized membranes. Sep. & Purif. Technol., 120, 373-377, 2013.
Wijmans, J.G.; Baker, R.W. The solution-diffusion model: a review. J. Membr. Sci., 107, 1-21, 1995.
Dutta, B. K.; Sikdar, S. K. Separation of volatile organic compounds from aqueous solutions by pervaporation using S-B-S block copolymer membranes, Environ. Sci. Technol., 33, 1709-1716, 1999.
Chen, Y.; Iqbal, Z.; Mitra, S. Microwave-Induced Controlled Purification of Single-Walled Carbon Nanotubes Without Sidewall Functionalization, Adv. Funct. Mater., 17, 3946-3951, 2007.
Shafee, E.E.; Naguib, H.F. Water sorption in cross-linked poly(vinyl alcohol) networks. Polymer, 44, 1647-1653, 2003.
Roger, C.E. Permeation of gases and vapors in polymers. J. Comyn (Ed.), Polymer Permeability, Elsevier Applied Science, New York, 32, 11-73, 1985.
Castro, E.F.; Gonzo, E.E.; Gottifredi, J.C. The analysis of sorption data of organic vapors in polymeric membranes through novel theories. J. Membr. Sci., 113, 57-64, 1996.
Liu, X.; Li, X.; Lu, Z.; Miao, X.; Feng, Y. Modified acrylic-based superabsorbents with hydrophobic monomers: synthesis, characterization and swelling behaviors. J Polym Res, 18(5):897-905, 2011.
Carlsson, A.; Lindman, B.; Nilsson, P.-G. Hydration of ethyl hydroxyethyl cellulose. Polymer, 27(3), 431-436, 1986.

(56) References Cited

OTHER PUBLICATIONS

Qu, X.; Wirsen, A.; Albertsson, A.C. Novel pH sensitive chitosan hydrogels: swelling behavior and states of water. Polymer, 41, 4589-4598, 2000.

Bekyarova, E; Hanzawa, Y.; Kaneko, K.; Silvestre-Albero, J.; Sepulveda-Escribano, A.; Rodriguez-Reinoso, F.; Kasuya, D.; Yudasaka, M.; Iijima, S. Cluster-mediated filling of water vapor in intratube and interstitial nanospaces of single-wall carbon nanohorns. Chemical Physics Letters, 366, 463-468, 2002.

Verweij, H.; Schillo, M.C.; Li, J. Fast Mass Transport Through Carbon Nanotube Membranes. Small, 3, 1996-2004, 2007.

Kar, S.; Bindal, R.C.; Tewari, P.K. Carbon nanotube membranes for desalination and water purification: Challenges and opportunities. Nano Today, 7, 385-389, 2012.

Hu, S.Y.; Zhang, Y.; Lawless, D.; Feng, X. Composite membranes comprising of polyvinylamine-poly(vinyl alcohol) incorporated with carbon nanotubes for dehydration of ethylene glycol by pervaporation. J. Membr. Sci., 417-418, 34-44, 2012.

Sajjan, A.M.; Jeevan Kumar, B.K.; Kittur, A.A.; Kariduraganavar, M.Y. Novel approach for the development of pervaporation membranes using sodium alginate and chitosan-wrapped multiwalled carbon nanotubes for the dehydration of isopropanol. J. Membr. Sci., 425-426, 77-88, 2011.

Mattia, D.; Leese, H.; Lee, K.P. Carbon nanotube membranes: From flow enhancement to permeability. J. Membr. Sci., 475, 266-272, 2015.

\* cited by examiner

CARBON NANOTUBE IMMOBILIZED SUPER-ABSORBING MEMBRANES

CROSS-REFERENCE TO RELATED APPLICATIONS

This non-provisional patent application claims the benefit of U.S. Provisional Patent Application Ser. No. 62/283,906 filed Sep. 15, 2015, the entirety of which is incorporated herein by reference.

FIELD OF THE DISCLOSURE

The present disclosure relates to super-absorbing membranes, and more particularly, carbon nanotube immobilized super-absorbing membranes operable to harvest pure water from air.

BACKGROUND

Recent climatic changes, fairly widespread drought and extensive water use are drawing the world into a state of water scarcity. Maintaining an adequate supply of potable water is a growing, world-wide challenge. On-site water treatment solutions are desirable to address this challenge.

SUMMARY OF THE INVENTION

On-site water generation systems and methods which extract water vapor from air are disclosed. Novel polymeric membranes including carbon nanotubes (CNTs) immobilized in a membrane containing super absorbent polymer are disclosed herein. The presently disclosed subject matter provides an attractive alternative approach for generating pure water. The membranes provide an effective method of sorbing water and breaking up water clusters for high permeation flux.

In addition to addressing the important application of generating drinking water from air, the membranes may be employed for many other humidity control applications. The removal of water vapor from gaseous streams also has many industrial applications which include the dehydration of natural and flue gases, drying of compressed air and storage of fruits and vegetables under protective atmosphere. See, Sijbesma et al., Flue gas dehydration using polymer membranes, J. Membr. Sci. 2008, 313, 263-276; Ahvenainen, New approaches in improving the shelf life of minimally processed fruit and vegetables, Trends in Food Sci. Technol. 1996, 7, 179-187. Humidity control in closed spaces such as air conditioning in buildings, aviation and space flight are of major importance. See, e.g., U.S. Pat. No. 7,017,365.

Several approaches to water vapor extraction from air to produce clean water have been studied. Typical methods of water extraction include cooling and refrigeration, liquid and solid desiccants, and compression. However, these conventional techniques possess inherent disadvantages. For example, condensed water can be contaminated, and desiccant systems involve energy inefficient regeneration steps and may have to be discarded after several uses. Jia et al., An experimental study on vapor condensation of wet flue gas in a plastic heat exchanger, Heat Transfer-Asian Res. 2001, 30 (7), 571-580; Zurigat et al., Air dehumidification by triethylene glycol desiccant in a packed column, Energy Convers. Manage. 2004, 45 (1), 141-155; Ito, Dehumidification of air by a hygroscopic liquid membrane supported on surface of a hydrophobic microporous membrane, J. Membr. Sci. 2000, 175 (1), 5-42.

Selective water vapor transport through polymeric membranes is an attractive approach because it provides continuous operation, has a relatively small footprint, is easy to operate and reduces energy costs. However, previous attempts to provide membrane-based dehumidification processes have shown relatively poor overall performance in terms of flux as well as water removal, and such processes are not competitive at this time. Allen, et al., The barrier properties of polyacrylonitrile, J. Membr. Sci. 1977, 2, 153-164. 15); Barrie, Proceedings of the Fourth BOC Priestly Conference 1986, 89-113; Zhao, et al., Diffusion and interfacial transport of water in Nafion. J. Phy. Chem. B 2011, 115, 2717-2727.

The introduction of functionalized CNTs in a super-absorbent polymer (SAP) membrane as disclosed herein provides the dual benefits of high water sorption along with nano-structured sorption-desorption sites for rapid mass transport. Highly hydrophilic carbon nanotube immobilized SAP (CNIM-SAP) membranes disclosed herein provide surprisingly good results in terms of water vapor extraction efficiency, water vapor removal and mass transfer coefficient in the generation of water from air.

In accordance with one or more embodiments, polymeric membranes operable to harvest water from air are disclosed. The polymeric membranes include a porous substrate and a layer disposed on a surface of the porous substrate, the layer including a plurality of carbon nanotubes immobilized in a super-absorbent polymer.

The porous substrate may be formed of a metal, ceramic, polymeric or other suitable material. Suitable polymeric materials include but are not limited to cellulose acetate, cellulose esters, polysulfone, polyether sulfone, polyacrylonitrile, polyamide, polyimide, polyethylene, polypropylene, polytetrafluoroethylene, polyvinylidene fluoride and polyvinylchloride. In some embodiments the porous substrate is hollow fiber polypropylene.

The carbon nanotubes may be single or multi-walled. In some embodiments, one or more of the carbon nanotubes may be carboxylated.

The SAP may be any suitable SAP such as but not limited to cross-linked poly(acrylamide-co-acrylic acid) and salts thereof and cross-linked sodium polyacrylate. In one or more embodiments the SAP is poly(acrylamide-co-acrylic acid).

In accordance with certain embodiments, methods of making carbon nanotube-immobilized membranes may include the steps of dispersing a plurality of carbon nanotubes in water to form a carbon nanotube dispersion, dissolving a super-absorbent polymer in water to form a super-absorbent copolymer solution, adding the super-absorbent copolymer solution to the carbon nanotube dispersion to form a super-absorbent polymer-carbon nanotube mixture, applying the super-absorbent polymer-carbon nanotube mixture to a surface of a porous substrate and drying the super-absorbent polymer-carbon nanotube mixture. In some embodiments the method may include carboxylating at least one of the plurality of carbon nanotubes prior to forming the dispersion.

In some embodiments it may be desirable to pre-treat the porous substrate prior to the step of applying the super-absorbent polymer-carbon nanotube mixture thereto to enhance adhesion between the porous substrate and the super-absorbent polymer-carbon nanotube mixture. In embodiments in which the porous substrate is polypropylene, such as polypropylene hollow fibers, the pre-treatment step may include hydrophilization. The hydrophilization step may be conducted by applying chromic acid to the porous substrate.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the devices and methods disclosed herein, reference is made to the accompanying figures, wherein.

DETAILED DESCRIPTION OF THE INVENTION

Figure 1:
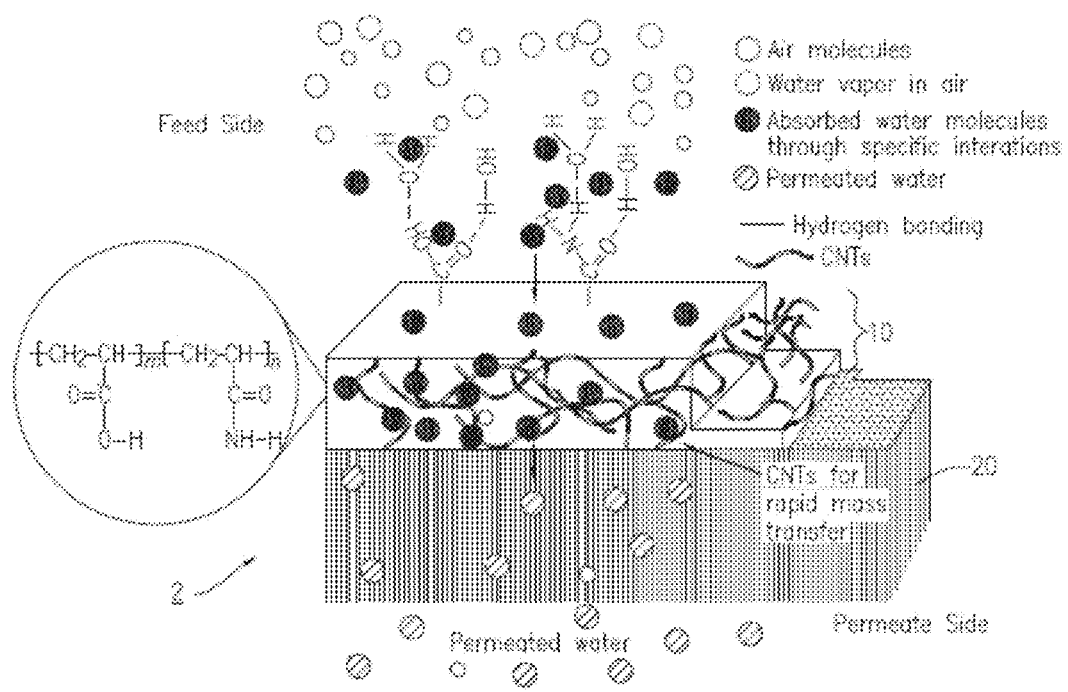
FIG. 1 is a schematic diagram of a CNIM-SAP membrane in accordance with one or more embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Now referring to FIG. 1, a polymeric membrane 2 includes a layer 10 including carbon nanotubes (CNTs) immobilized in a super-absorbent polymer (SAP). For the sake of brevity the layer 10 including CNTs immobilized in the SAP may be referred to herein as the CNIM-SAP layer 10. The CNIM-SAP layer may be further disposed on a porous substrate 20.

The carbon nanotubes may be any suitable carbon nanotube such as those commercially available from Cheap Tubes Inc., Brattleboro, Vt. The CNTs may be single or multi-walled. The diameter of the CNTs may range from about 1 nm to about 100 nm. The length of the CNTs may range from about 1 to about 25 μm. In some embodiments the CNTs are carboxylated.

In general, super-absorbent polymers (SAPs) are materials that have the ability to absorb and retain large volumes of water and aqueous solutions. As is known to those skilled in the art, the absorbing capacity of a SAP depends at least in part on the ion content of the water or aqueous solution being absorbed. As used herein, in some embodiments a super-absorbent polymer (SAP) is any polymer that can absorb and retain at least 100 times its weight in deionized and/or distilled water. In accordance with further embodiments, a SAP may be any polymer that can absorb at least 27 times its weight in 1% saline solution. Suitable SAPs include but are not limited to cross-linked poly(acrylamide-co-acrylic acid) and salts thereof, cross-linked sodium polyacrylate, etc. In some embodiments the SAP is poly(acrylamide-co-acrylic acid) commercially available from Sigma-Aldrich (St. Louis, Mo.).

The porous substrate 20 may be formed of any suitable material, such as but not limited to polymers or mixtures thereof, heterogeneous solids, metal, ceramic, etc. Exemplary suitable polymers include but are not limited to cellulose acetate, cellulose esters (CA, CN, and CE), polysulfone (PS), polyether sulfone (PES), polyacrylonitrile (PAN), polyamide, polyimide, polyethylene (PE), polypropylene (PP), polytetrafluoroethylene (PTFE), polyvinylidene fluoride (PVDF), polyvinylchloride (PVC). The porous substrate may be formed in various configurations such as a sheet, film, etc. In some embodiments the porous substrate is a polypropylene hollow fiber material such as but not limited to Celgard X-20 polypropylene.

In one embodiment the CNIM-SAP layer 10 is made by functionalizing the CNTs to a carboxylated form using techniques known to those skilled in the art. CNTs are dispersed in water such as by sonication. The SAP is dissolved separately in water to form a copolymer solution. The SAP copolymer solution is added to the CNT dispersion to form a SAP-CNT mixture. The SAP-CNT mixture is then applied to a substrate 20 and dried, forming a CNIM-SAP layer 10.

In some embodiments the substrate 20 may be pre-treated to provide enhanced adhesion between the porous substrate 20 and the CNIM-SAP layer 10. For example, in cases in which the porous substrate 20 material is hydrophobic, such as is the case with polypropylene, the porous substrate 20 may be hydrophilized, such as by treatment with chromic acid, and then after hydrophilization, the SAP-CNT applied to achieve a composite membrane structure as shown in FIG. 1.

Examples and Experiments

Poly(acrylamide-co-acrylic acid), potassium dichromate ($K_2Cr_2O_7$), sulphuric acid (95.7% purity, ACS reagent), and acetone (99% purity) were obtained from Sigma-Aldrich (St. Louis, Mo.). $N_2$ high purity (Air Gas, NJ) and deionized water were used in the experiments and examples. Raw multi-walled carbon nanotubes (CNTs) were purchased from Cheap Tubes Inc., Brattleboro, Vt. The average diameters of the CNTs were about 30 nm and a length of up to 15 μm. Celgard X-20 PP hollow fibers were employed as a porous substrate 20.

The raw CNTs were functionalized to their carboxylated form in a Microwave Accelerated Reaction System (Mode: CEM Mars) using methods published previously. See, Chen, Y et al., Microwave-Induced Controlled Purification of Single-Walled Carbon Nanotubes Without Sidewall Functionalization, Adv. Funct. Mater. 2007, 17, 3946-3951. The CNTs were treated with a mixture of concentrated sulfuric acid and nitric acid solution at 140° C. for 20 min in the microwave to form carboxylated CNT analogs. These were washed, filtered and dried under vacuum at 80° C. The CNTs were carboxylated to be more hydrophilic so that they could interact with the water vapor and be compatible with the SAP phase.

A hollow fiber membrane module was prepared within a 30 cm long stainless steel casement with male tee connectors placed at each end of the module. The casement and hollow fiber strands were sealed using a fast drying epoxy resin (Resin Technology Group, LLC, S Easton, Mass.). The sealed "T" units prevented intermixing of the lumen and permeated contents and served as the inlet/outlet for the sample and the permeate. The effective surface area of the module was calculated as 94.03 $cm^2$.

0.1 wt % carboxylated CNTs were dispersed in water via sonication for 3 hrs. The —COOH functional groups provided good dispersibility. The poly(acrylamide-co-acrylic acid) SAP was dissolved separately in water under stirring condition overnight to form a copolymer solution. This copolymer solution was then added to the CNT dispersion and the mixture was mechanically stirred for 3 hrs.

Celgard X-20 PP hollow fibers are highly hydrophobic in nature, and therefore they were hydrophilized by chromic acid treatment to make a compatible surface and for better adhesion with the SAP film. After hydrophilization, the aqueous solution of SAP-CNT was passed through the bore of hydrophilized membrane hollow fibers at a low flow rate. The excess solution was removed by flushing the air at very low flow rate through the module. The module was then placed in an oven at 60° C. for overnight for further annealing. The composite membrane structure was as depicted in FIG. 1.

The CNIM-SAP membrane was characterized by using scanning electron microscopy (SEM, Leo 1530 VP, Carl Zeiss SMT AG Company, Oberkochen, Germany). This was done by cutting the membranes into 0.5 cm long pieces and coating with carbon films. Thermogravimetric analysis (TGA) was used to investigate the degradation of modified membrane materials during heating. TGA was carried out using a Perkin-Elmer Pyris 7 TGA system at a heating rate of 10° C./min under air. The glass transition temperature (Tg) was measured using a differential scanning calorimetry (DSC) analyzer (model DSC822e, Mettler Toledo, Switzerland). The temperature range for these experiments was 0-250° C. at a scanning rate of 10° C./min. Contact angle measurements were made to study the hydrophilic nature of the CNIM-SAP. These measurements were performed using a digital video camera mounted at the top of the stage.

The sorption isotherms were measured as follows. Flat CNIM-SAP membrane was prepared from its aqueous solution by casting over a Teflon sheet. The dried and pre-weighed membrane was placed in a temperature control box. Water vapor at different concentrations was generated from a water sample and circulated with constant low flow nitrogen to maintain a particular RH in the system. The weight of the membrane was measured at different time intervals till saturation. Sorption experiments were also conducted at three different temperatures, i.e., 30, 40, and 50° C.

Figure 2:
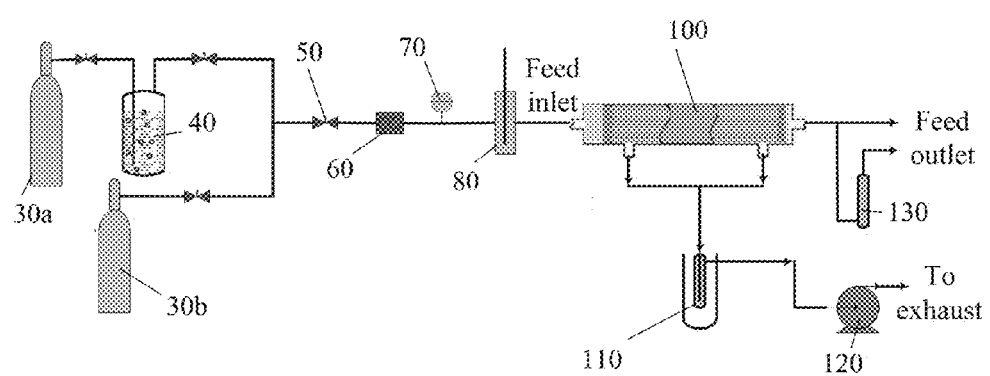
FIG. 2 is a schematic diagram of an experimental system used for water harvesting in accordance with one or more embodiments of the present invention.

Now referring to FIG. 2, an experimental setup for water vapor removal from a simulated air stream is shown. A first gas cylinder 30a supplied a $N_2$ gas stream which was passed through a water-filled bubbler 40. This stream was mixed with another dry $N_2$ gas stream supplied by a further gas cylinder 30b to deliver a water vapor feed with a certain concentration to a feed inlet of the CNY-modified composite membrane module 100. The desired water vapor concentration were achieved by carefully adjusting the flow rates of the N2 streams using flow controller 50, flow meter 60 and pressure gauge 70 as well as humidity measurement probe 80. The feed flow rates were varied from 1-5 ml/min and the water vapor concentrations were varied between 4,000 to 40,000 ppm. A vacuum pump 120 was connected to the shell-side of the module 100 through a cold trap 110 immersed in a liquid nitrogen container. The highly hydrophilic membranes allowed only water vapor to pass through the membrane. The water vapor was collected into the cold trap 110. A bubble flow meter 130 was used to measure feed outlet flow. The concentration of water vapor in the feed and collected samples was calculated.

Figure 3A:
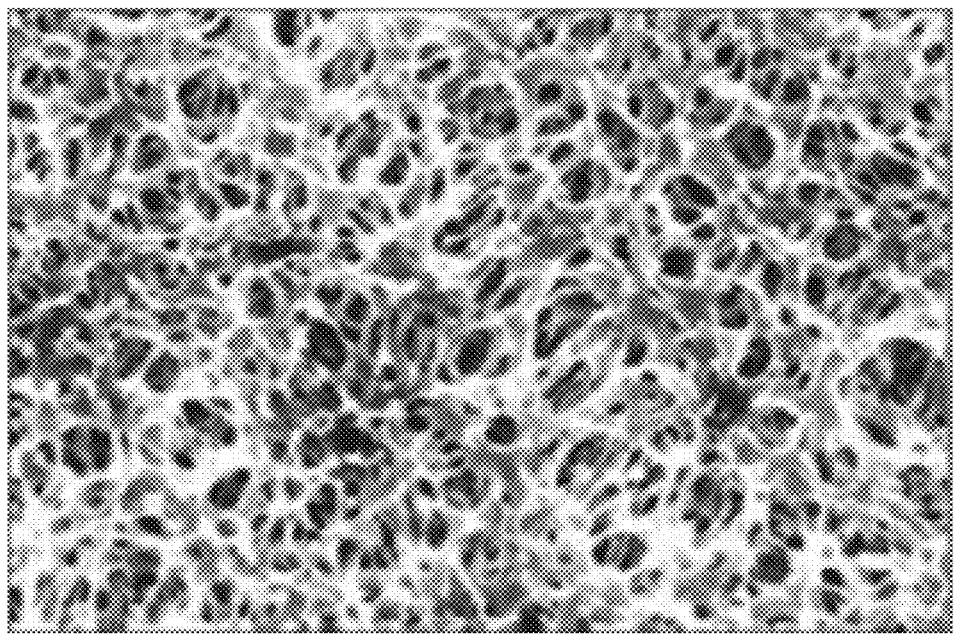
FIGS. 3A-3D are SEM images of the surfaces of a plain PP substrate (FIG. 3A), a SAP (FIG. 3B), a CNIM-SAP construct (FIG. 3C), and a cross section of a CNIM-SAP membrane (FIG. 3D) in accordance with one or more embodiments of the present invention.
Figure 3B:
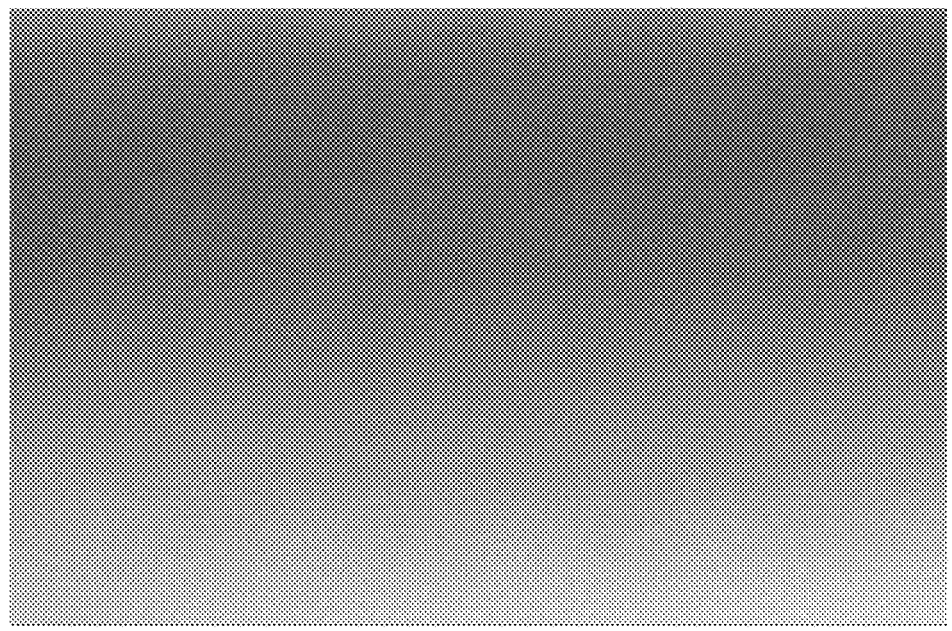
Figure 3C:
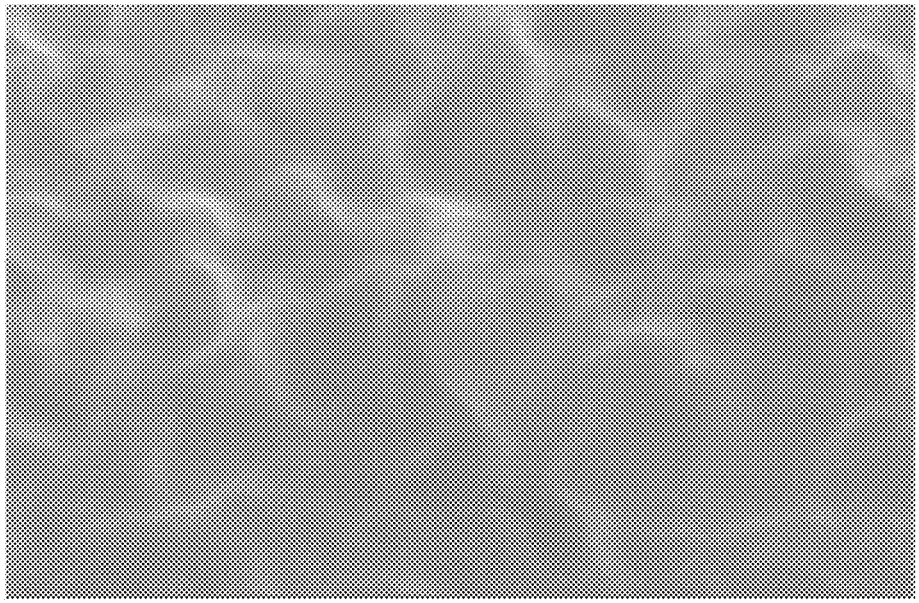
Figure 3D:
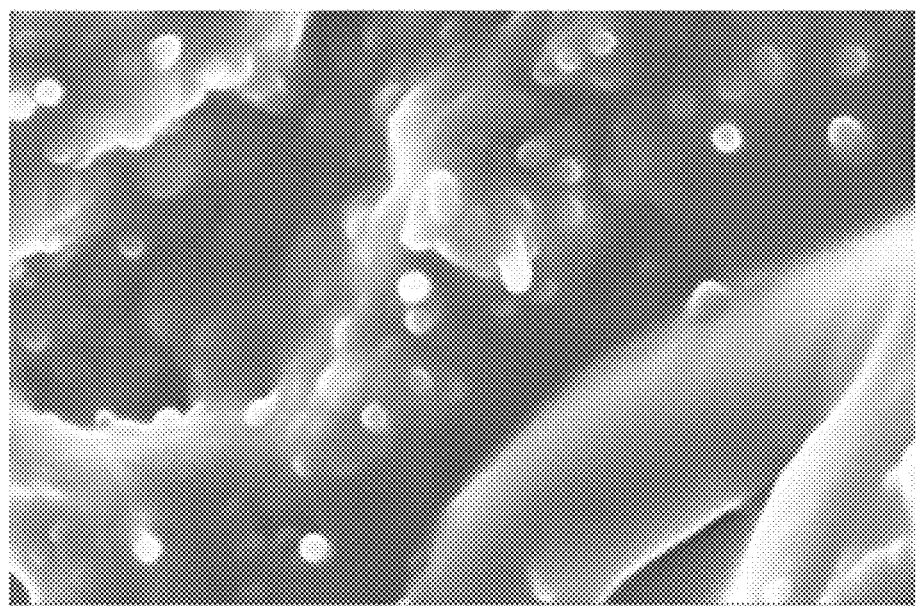

Now referring to FIGS. 3A-3C, SEM images of the surfaces of a plain PP substrate, SAP and CNIM-SAP are shown, respectively. FIG. 3B shows a defect-free dense SAP layer over the hydrophilized PP substrate. The wrinkled surface of the CNIM-SAP in FIG. 3C indicates the presence of CNTs embedded into the polymer matrix. With reference to FIG. 3D, the cross-section of the CNIM-SAP layer clearly shows uniform dispersion of CNTs in the SAP matrix.

Figure 4A:
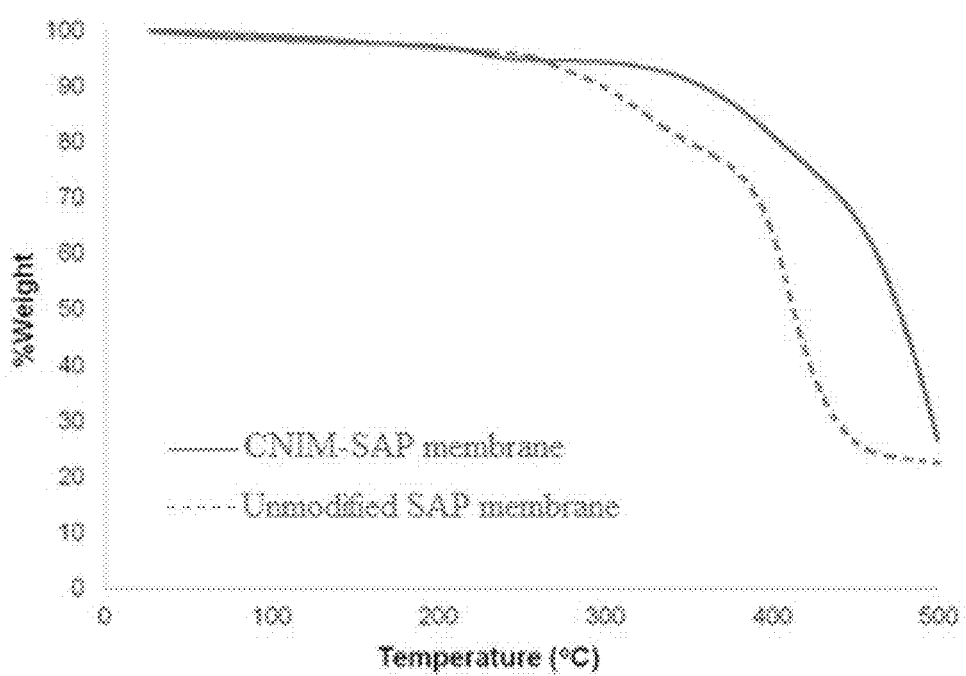
FIG. 4A is a graphical depiction of TGA analysis of a CNIM-SAP membrane in accordance with one or more embodiments of the present invention and an unmodified SAP membrane.
Figure 4B:
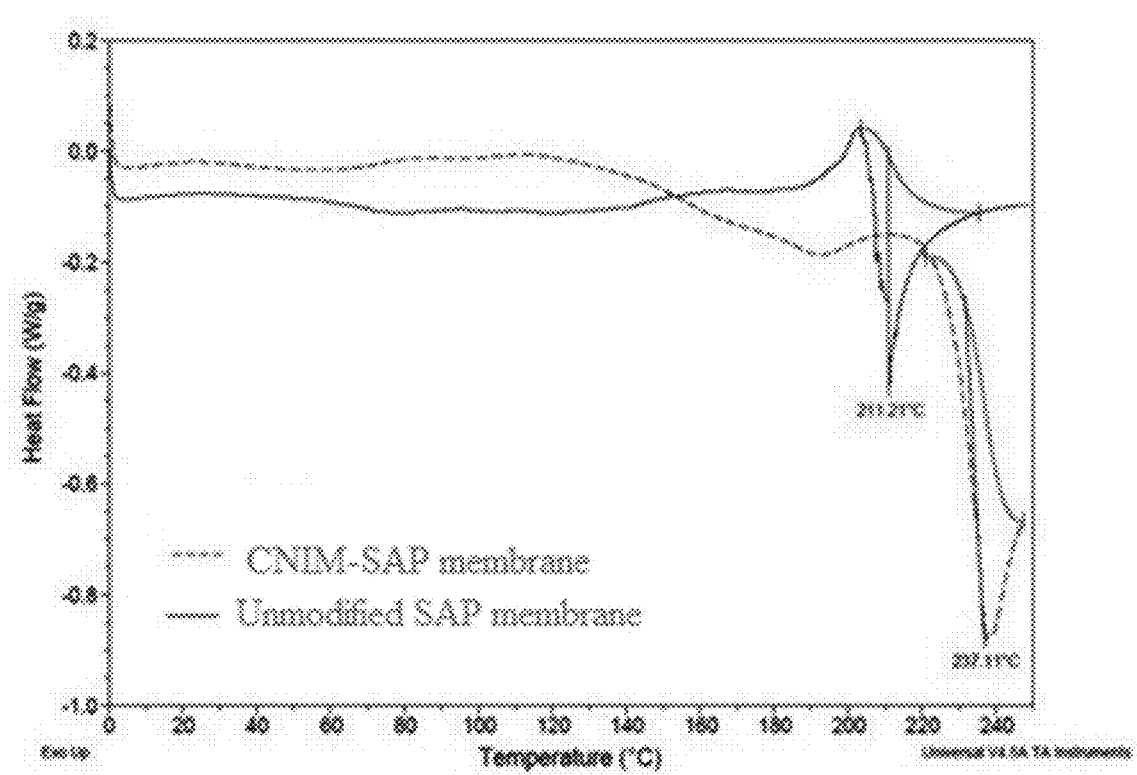
FIG. 4B is a graphical depiction of DSC curves of a CNIM-SAP membrane in accordance with one or more embodiments of the present invention and an unmodified SAP membrane.

Now referring to FIGS. 4A and 4B, thermal degradation behavior and thermal stability of the CNIM-SAP was studied by thermogravimetric analysis (TGA). FIG. 4A reflects the TGA curve of the composite membrane. It is clear from FIG. 4A that the membrane is quite stable at moderate temperature. The TGA curve of the composite membrane showed its first weight loss stage occurring at 275° C. followed by a sharp decomposition at 400° C. FIG. 4A also demonstrates a slight increase in thermal stability for the CNIM-SAP membrane due to the presence of CNTs in the polymer matrix. FIG. 4B shows the DSC curves of the composite membrane. A relatively high glass transition temperature was observed at 237° C.

Figure 5:
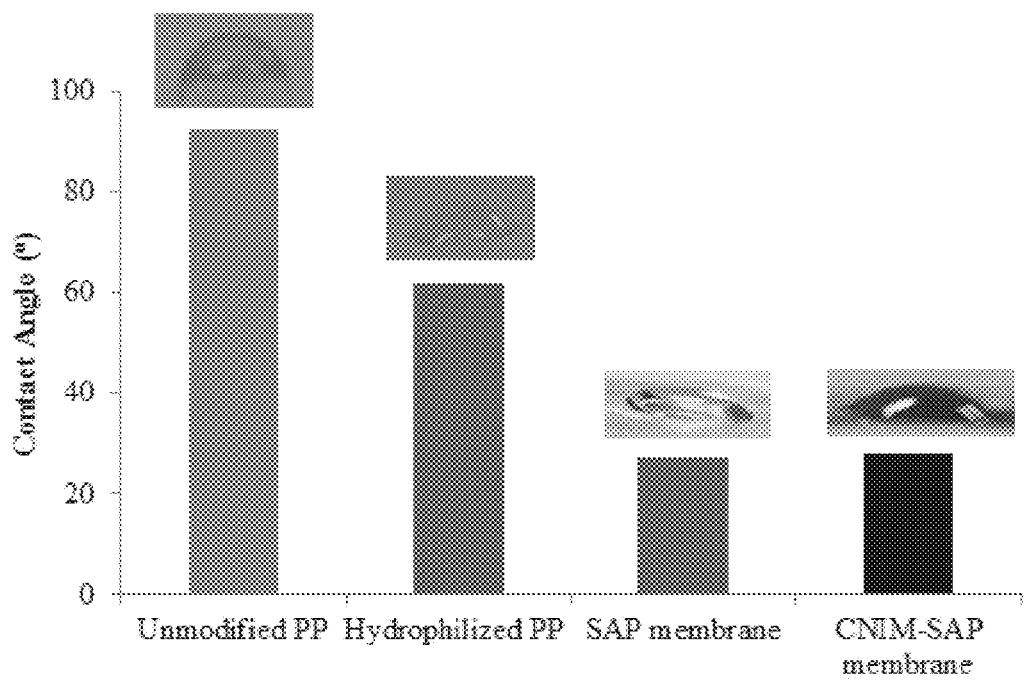
FIG. 5 is a graphical depiction of a contact angle and accompanying photograph of a water drop on a) an unmodified PP membrane; b) a hydrophilized PP membrane; c) a SAP membrane over modified PP substrate; and d) a CNIM-SAP membrane over the modified PP substrate in accordance with one or more embodiments of the present invention.

Now referring to FIG. 5, the change in hydrophilicity of the unmodified and modified PP substrate is presented. The contact angle value of unmodified PP membrane) (92.5° clearly demonstrates the hydrophobic nature of the membrane. After hydrophilization, the contact angle reduced to well below 90° for the modified PP substrate. The SAP and CNIM-SAP coatings over the modified PP substrate exhibits a similar type of enhanced hydrophilicity and the contact angle reduced further to about 28°.

Performance of CNIM-SAP

The transport of gas through a dense polymeric membrane is usually governed by a solution-diffusion mechanism. Wijmans, J. G.; Baker, R. W., The solution-diffusion model: a review, J. Membr. Sci. 1995, 107, 1-21. Here the gas molecules preferentially sorb onto the membrane surface which is followed by the diffusion under a concentration gradient. The rate of transport of solute across the membrane can be expressed in terms of flux, which can be expressed as:

$$J_w = k(p_{w,f} - p_{w,p}) \tag{1}$$

The reciprocal of k is the overall resistance to mass transfer, which is the sum of the liquid boundary layer resistance ($1/k_L$), membrane resistance ($1/k_M$), and vapor boundary resistance ($1/k_V$);

$$\frac{1}{k} = \frac{1}{k_L} + \frac{1}{k_M} + \frac{1}{k_V} \tag{2}$$

The partitioning of water vapors on the membrane and its desorption on the permeate side may be considered instantaneous and the vapor phase boundary layer on the permeate side may be assumed to offer negligible mass transfer resistance. Dutta, B. K., Sikdar, S. K., Separation of volatile organic compounds from aqueous solutions by pervaporation using S-B-S block copolymer membranes, Environ. Sci. Technol. 1999, 33, 1709-1716. Therefore, the maximum mass transfer resistances are attributed to the boundary layer at the membrane-air interface and the diffusion through the membrane. The liquid boundary layer resistance depends upon the feed flow rate, viscosity, diffusivity, whereas the membrane resistance is a function of the membrane thickness, temperature, and permeability of the specific compound. Dutta, B. K., Sikdar, S. K., Separation of volatile organic compounds from aqueous solutions by pervaporation using S-B-S block copolymer membranes, Environ. Sci. Technol. 1999, 33, 1709-1716.

As the concentration of water vapor in the permeate side is negligible, the overall mass transfer coefficient (k) can be described as, $$\text{or, } k = \frac{J_w}{p_{w,f}} \tag{3}$$

The efficiency of the process was quantified based on the removal of water vapor from the air stream and was expressed as percent water vapor removal (% R)

$$\% \ R = \left[\frac{(F_i C_i - F_0 C_0)}{F_i C_i}\right] \times 100 \tag{4}$$

$$\% \ R = \left[\frac{F_p C_p}{F_i C_i}\right] \times 100$$

The rate of water vapor transport across the membrane can be expressed in terms of flux $J_w$ (gm-mol·cm$^{-2}$·min$^{-1}$)

$$J_w = \left[\frac{(F_i C_i - F_0 C_0)}{A \cdot t}\right] \tag{5}$$

$$J_w = \left[\frac{F_p C_p}{A \cdot t}\right]$$

Figure 6:
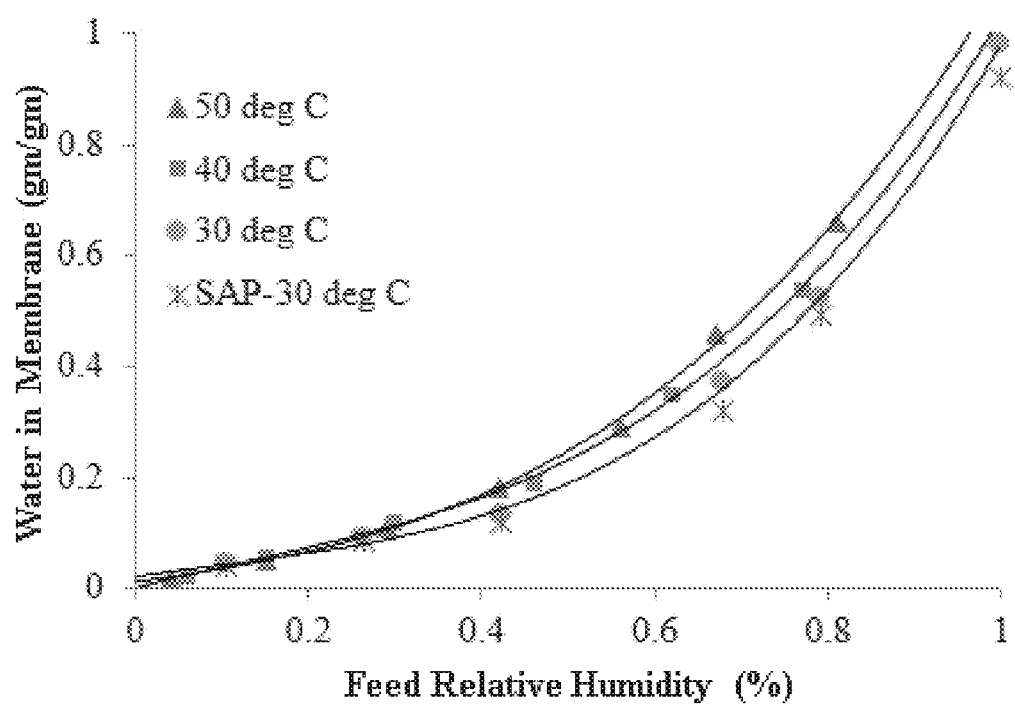
FIG. 6 is a graphical depiction of variation of water sorption in CNIM-SAP at different water vapor concentrations and at different temperatures in accordance with one or more embodiments of the present invention.

Now referring to FIG. 6, the specific sorption capacity of the water by CNIM-SAP as a function of relative humidity at different temperatures is depicted. The presence of the small amount of CNTs did not alter the sorption characteristics of the SAP. From FIG. 6 it is also observed that the increase in temperature did not significantly alter the sorption capacity of the CNIM-SAP. This is a surprising and interesting feature because under normal circumstances the sorption decreases with increase in temperature, but that was not observed in the temperature range studied. The ideal and linear sorption behavior as described by Henry's Law of adsorption can be altered dramatically by specific interactions with the polymer and among the solute molecules. It is evident from FIG. 6 that the sorption isotherms closely resemble Rogers Type-III sorption. These types of isotherms are observed when water molecules serve as swelling agents for the polymer, and follow the Flory-Huggins principle where the solubility coefficient increase with pressure. See, Flory, P. J. Principles of Polymer Chemistry, Cornell University Press, Ithaca, N.Y., 1973; Shafee, E. E., Naguib, H. F., Water sorption in cross-linked poly(vinyl alcohol) networks, Polymer 2003, 44, 1647-1653. Here the mutual interaction of the sorbed water molecules leads to the formation of clusters within the membrane matrix. See, Roger, C. E., Permeation of gases and vapors in polymers, J. Comyn (Ed.), Polymer Permeability, Elsevier Applied Science, New York, 1985, 32.

Figure 7A:
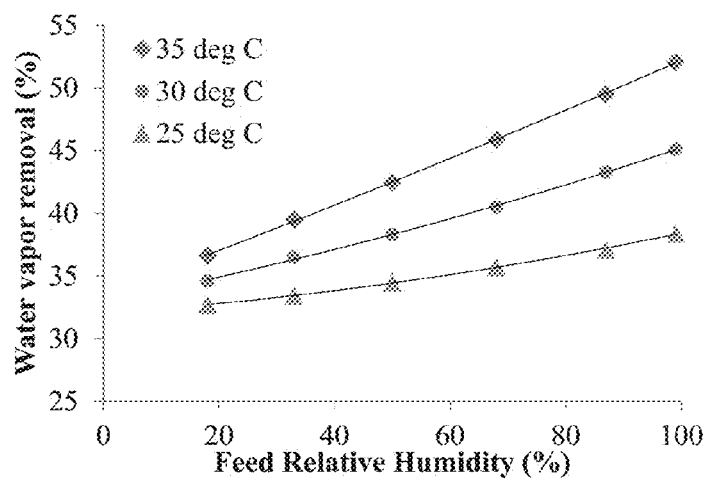
FIGS. 7A-7C are graphical depictions of data reflecting water vapor removal (FIG. 7A), water vapor flux (FIG. 7B), and enhancement in water vapor removal (at 1 mL/min) (FIG. 7C) as a function of the inlet feed concentration for CNIM-SAP membranes in accordance with one or more embodiments of the present invention.
Figure 7B:
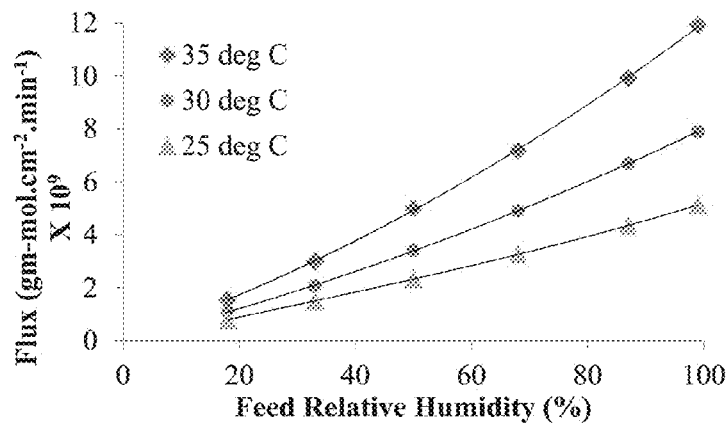
Figure 7C:
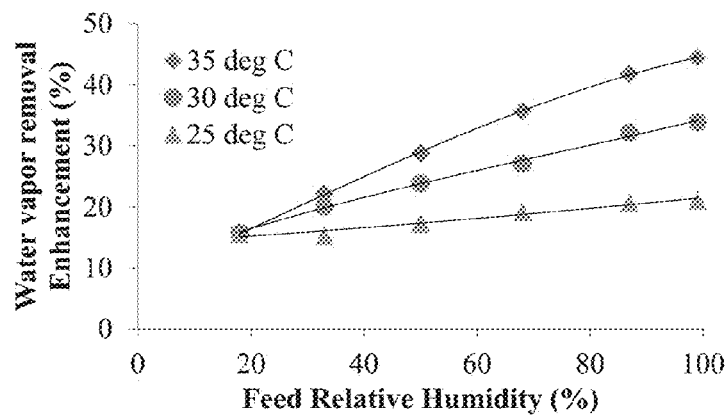

Now referring to FIGS. 7A-7B, water vapor removal was evaluated as a function of feed concentration at different temperatures. The water vapor percent removal (FIG. 7A) and flux (FIG. 7B) increased with relative humidity. This was attributed to the enhanced driving force for mass transfer. In the temperature range evaluated, the increase in water vapor removal and flux was attributed to the increase in diffusion coefficient. In typical solution diffusion models the permeability is given as a product of solubility in the membrane and diffusion coefficient. Under normal circumstances the former is known to decrease with an increase in temperature, see, Castro, et al., The analysis of sorption data of organic vapors in polymeric membranes through novel theories, J. Membr. Sci. 1996, 113, 57-64, but as seen from FIGS. 7A and 7B that was not the case. Therefore, permeation was directly related to diffusion coefficient. As already mentioned, the sorbed water molecules formed clusters within the membrane matrix and this prevented their rapid permeation. However, in the CNIM-SAP the transport of the water vapor could take place in the CNT domains where the CNTs allow the water vapor molecules to adsorb-desorb easily and migrate to the permeate side. In short, the CNTs can break up the water clusters and facilitate faster water vapor transport. The enhancement in the percentage water extracted by the CNTs is shown FIG. 7C. A significant improvement in water vapor removal was observed and the enhancement increased with temperatures and was as high as 45%. At high humidity more water clusters were formed in the SAP and the CNTs were more effective in breaking them up which led to higher enhancements.

Figure 8A:
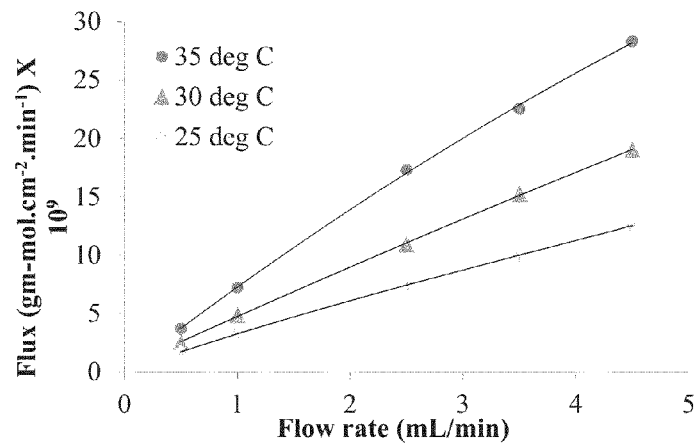
FIGS. 8A-8C are graphical depictions of data reflecting the water vapor flux (FIG. 8A), water vapor removal (FIG. 8B), and enhancement in water vapor removal (at 68% RH) as a function of the inlet flow rate at different temperatures for CNIM-SAP membranes in accordance with one or more embodiments of the present invention.
Figure 8B:
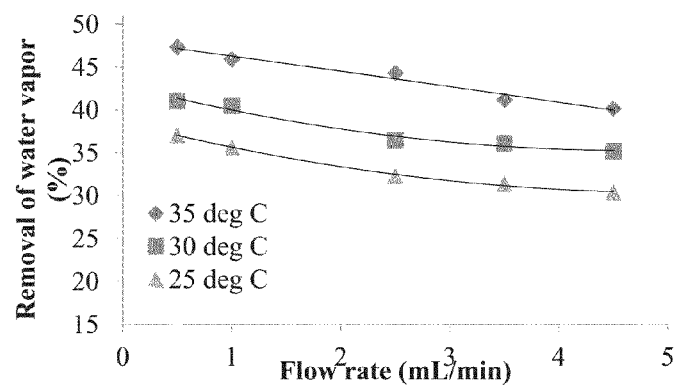
Figure 8C:
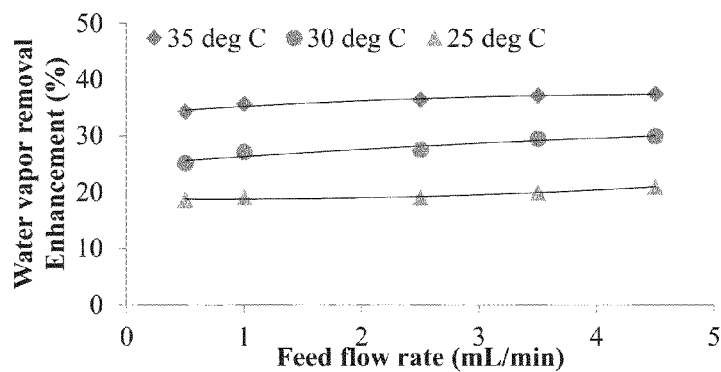

Now referring to FIG. 8A, water vapor flux is shown as a function of the inlet air flow rate. It was observed that the flux increased with the feed flow rate. However, with reference to FIG. 8B, the percent removal of water vapor reduced with an increase in flow rate due to lower residence time. It was also observed that at a given flow rate the flux and percent water removal increased with increase in temperature. Now referring to FIG. 8C, the variation in enhancement in the presence of CNTs at different feed flow rates and temperatures is shown. The CNIM-SAP exhibited higher enhancement at increased temperature. The increase in flow rate led to a reduction in boundary layer formation on the membrane surface. Since the CNTs were embedded in the matrix, they did not affect the boundary layer formation. Consequently the enhancement in water removal in the presence of CNTs was not affected by feed flow rate.

Tables 1A and 1B present the mass transfer coefficients as functions of water vapor concentration and feed flow rate, respectively. At low flow rates the overall mass transfer was controlled by diffusion through the boundary layer. With increase in flow rate increased turbulence and reduced the boundary layer at the membrane interface leading to higher mass transfer coefficients. There was only slight increase in mass transfer coefficient with relative humidity. The overall mass transfer coefficients also increased with increase in temperature as the diffusion coefficients increased. The tables also present the enhancement in mass transfer coefficients for the CNIM-SAP in comparison to the membrane without CNTs.

TABLE 1A

Mass transfer coefficient and its enhancement in comparison with unmodified membrane as a function of feed concentration at a feed flow rate 1.0 mL/min

| Feed concentration (RH %) | k at 25° C. ($10^{-7}$ m/s) | k at 30° C. ($10^{-7}$ m/s) | k at 35° C. ($10^{-7}$ m/s) | Enhancement at 25° C. (%) | Enhancement at 30° C. (%) | Enhancement at 35° C. (%) |
|---|---|---|---|---|---|---|
| 18 | 5.8 | 6.13 | 6.49 | 15.77 | 16.76 | 15.48 |
| 33 | 5.92 | 6.46 | 7 | 15.40 | 19.85 | 22.16 |
| 50 | 6.11 | 6.79 | 7.6 | 17.27 | 23.91 | 29.91 |
| 68 | 6.32 | 7.17 | 8.14 | 19.02 | 26.90 | 35.67 |
| 87 | 6.58 | 7.67 | 8.78 | 20.73 | 32.01 | 41.84 |
| 99 | 6.81 | 7.99 | 9.24 | 21.17 | 33.84 | 44.38 |

TABLE 1B

Mass transfer coefficient and its enhancement in comparison with unmodified membrane as a function of feed flow rate (at 68% RH)

| Feed flow rate (mL/min) | k at 25° C. ($10^{-6}$ m/s) | k at 30° C. ($10^{-6}$ m/s) | k at 35° C. ($10^{-6}$ m/s) | Enhancement at 25° C. (%) | Enhancement at 30° C. (%) | Enhancement at 35° C. (%) |
|---|---|---|---|---|---|---|
| 0.5 | 0.328 | 0.37 | 0.42 | 18.41 | 25.42 | 34.29 |
| 1 | 0.63 | 0.72 | 0.81 | 18.87 | 27.43 | 35.00 |
| 2.5 | 1.43 | 1.61 | 1.96 | 19.17 | 30.89 | 36.11 |
| 3.5 | 1.95 | 2.24 | 2.55 | 20.37 | 29.48 | 37.10 |
| 4.5 | 2.42 | 2.81 | 3.2 | 21.00 | 30.09 | 37.34 |

Figure 9:
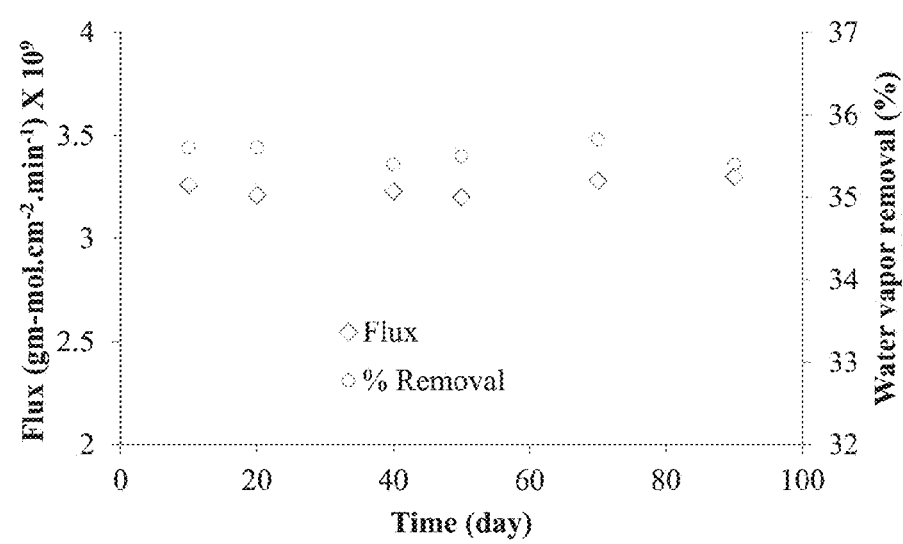
FIG. 9 is a graphical depiction of CNIM-SAP membrane performance in terms of water vapor flux and % water vapor removal with time (at 25° C. and 68% RH) in accordance with one or more embodiments of the present invention.

Now referring to FIG. 9, the stability of the membrane in terms of water vapor flux and % water vapor removal was plotted against time. FIG. 9 shows that the membrane was quite stable for long term use.

Mechanism of Water Permeation in CNIM-SAP

Figure 10:
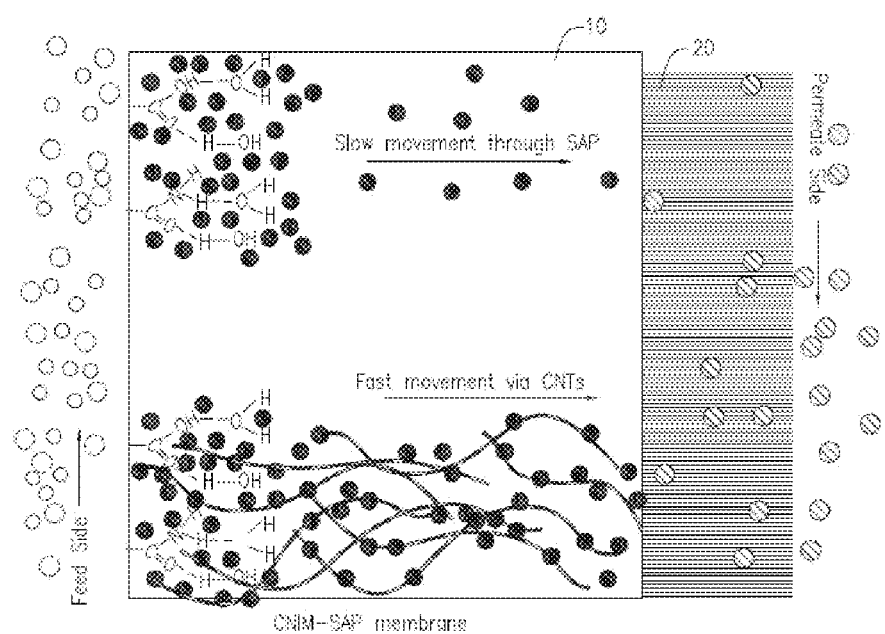
FIG. 10 is a schematic representation of the permeation of water molecules through a CNIM-SAP membrane in accordance with one or more embodiments of the present invention.

With reference to FIG. 10, mechanistically speaking, without being confined to a single theory, the permeation of water vapor molecules in the CNIM-SAP polymeric membranes disclosed herein occurred through several successive steps. Initially, the moisture in the feed absorbed on the membrane surface and in the free spaces within the membrane. These absorbed molecules then diffused across the membrane to the permeate side. The strong interaction between water and the SAP is an important consideration. The water in SAP membrane can be classified as bound, semi-bound and free water. See, Liu et al., Modified acrylic-based superabsorbents with hydrophobic monomers: synthesis, characterization and swelling behaviors. J. Polym Res (2011) 18:897-905. The SAP molecules strongly interact with the "bound water" and physically restrict its permeation by creating a gel. The portion of water molecules that does not participate in hydrogen bonding with polymer is termed "free water". The amount of free water depends upon the water-polymer interactions and the ability of the water to form clusters within the free space of the membrane. See, Qu et al., Novel pH sensitive chitosan hydrogels: swelling behavior and states of water, Polymer 2000, 41, 4589-4598; Carlsson, et al., Hydration of ethyl hydroxyethyl cellulose, Polymer 1986, 27, 431-436.

The CNTs interact with water via multiple mechanisms. The presence of hydrophobic CNTs reduces hydrogen bonding among the water molecules and with the SAP. See, Bekyarova et al., Cluster-mediated filling of water vapor in intratube and interstitial nanospaces of single-wall carbon nanohorns, Chemical Physics Letters 2002, 366, 463-468. The CNTs show high hydraulic conductivity due to liquid slip at the solid-liquid boundary, subcontinuum alteration of dipole orientation and apparent reduction in liquid viscosity on the CNT surface. In short, the enhancement of flux in CNIM-SAP is due to CNTs ability to influence water-polymer interactions, leading to the generation of more free water that can be easily transported along frictionless CNTs.

The highly hydrophilic CNIM-SAP was successfully employed to harvest water vapor from air. The presence of CNTs led to higher amounts of water vapor being extracted which increased with relative humidity. The CNIM-SAP demonstrated several advantages over a membrane without CNTs including enhanced water vapor removal as high as 52%, and 44% enhancement in mass transfer coefficients. The water vapor flux and the mass transfer coefficient of the membrane reached as high as 28.31E-9 gm-mol·cm$^{-2}$·min$^{-1}$ and 8.14E-7 respectively. Thus the CNIM-SAP membranes may be successfully employed in various water harvesting applications.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention. All references listed and/or referred to herein are incorporated by reference in their entireties.

REFERENCES

Sijbesma, H.; Nymeijer, K.; Marwijk, R.; Heijboer, R.; Potreck, J.; Wessling, M. Flue gas dehydration using polymer membranes. J. Membr. Sci. 2008, 313, 263-276.

Ahvenainen, R. New approaches in improving the shelf life of minimally processed fruit and vegetables. Trends in Food Sci. Technol. 1996, 7, 179-187.

Haas, J.; Sauterleute, A. System for dehumidification in air conditioners. U.S. Pat. No. 7,017,365, Mar. 28, 2006.

Jia, L. et al., An experimental study on vapor condensation of wet flue gas in a plastic heat exchanger. Heat Transfer-Asian Res. 2001, 30 (7), 571-580.

Zurigat, Y. H.; Abu-Arabi, M. K.; Abdul-Wahab, S. A. Air dehumidification by triethylene glycol desiccant in a packed column. Energy Convers. Manage. 2004, 45 (1), 141-155.

Ito, A. Dehumidification of air by a hygroscopic liquid membrane supported on surface of a hydrophobic microporous membrane. J. Membr. Sci. 2000, 175 (1), 5-42.

Zhang, L. Z. Mass diffusion in a hydrophobic membrane humidification/dehumidification process: the effects of membrane characteristics. Sep. Sci. Technol. 2006, 41 (8), 1565-1582.

Wang, K. L. et al., Hollow fiber air drying, J. Membr. Sci. 1992, 72 (3), 231-244.

Wang, Z. G.; Chen, T. L.; Xu, J. P. Gas and water vapor transport through a series of novel poly(aryl ether sulfone) membranes. Macromolecules 2001, 34 (26), 9015-9022.

Hengl, N.; Mourgues, A.; Pomier, E.; Belleville, M. P.; Paolucci-Jeanjean, D.; Sanchez, J.; Rios, G. Study of a newmembrane evaporator with a hydrophobic metallic membrane. J. Membr. Sci. 2007, 289 (1-2), 169-177.

Bolto, B.; Hoang, M.; Xie, Z. A review of water recovery by vapour permeation through membranes. water research 2012, 46, 259-266.

Allen, S. M.; Fujii, M.; Stannett, V.; Hopfenberg, H. B.; Williams, J. L. The barrier properties of polyacrylonitrile. J. Membr. Sci. 1977, 2, 153-164.

Metz, S. J.; van de Ven, W. J. C.; Potreck, J.; Mulder, M. H. V.; Wessling, M. Transport of water vapor and inert gas mixtures through highly selective and highly permeable polymer membranes. J. Membr. Sci. 2005, 251 (1-2), 29-41.

Jia, L.; Xu, X. F.; Zhang, H. J.; Xu, J. P. Permeation of nitrogen and water vapor through sulfonated polyetherethersulfone membrane. J. Polym. Sci. Polym. Phys. Ed. 1997, 35, 2133-2140.

Barrie, J. A. Proceedings of the Fourth BOC Priestly Conference 1986, 89-113.

Zhao, Q.; Majsztrik, P.; Benziger, J. Diffusion and interfacial transport of water in Nafion. J. Phy. Chem. B 2011, 115, 2717-2727.

Hussain, C. M.; Saridara, C.; Mitra, S. Carbon Nanotubes as Sorbents for the Gas Phase Preconcentration of Semivolatile Organics in a Microtrap. Analyst 2008, 133, 1076-1082.

Holt, J. K.; Park, H. G.; Wang, Y.; Stadermann, M.; Artyukhin, A. B.; Griporopolous, C. P.; Noy, A.; Bakajin, O. Fast Mass Transport Through Sub-2-Nanometer Carbon Nanotubes. Science 2006, 312, 1034-1037.

Hummer, G.; Rasaiah, J. C.; Nowortya, J. P. Water conduction through the hydrophobic channel of a carbon nanotube. Nature 2001, 414, 188-190.

Hinds, B. J.; Chopra, N.; Rantell, T.; Andrews, R.; Gavalas, V.; Bachas, L. Aligned Multiwalled Carbon Nanotube Membranes. Science 2004, 303, 62-65.

Noy, A.; Park, H. G.; Fornasiero, F.; Holt, J. K.; Grigoropoulos, C. P.; Bakajin, O. Nanofluidics in carbon nanotubes. Nano Today 2007, 2, 22-29.

Chen, H.; Sholl, D. S. Predictions of selectivity and flux for $CH_4/H_2$ separations using single walled carbon nanotubes as membranes. J. Membr. Sci. 2006, 269, 152-160.

Sae-Khow, O.; Mitra, S. Simultaneous Extraction and Concentration in Carbon Nanotube Immobilized Hollow Fiber Membranes. Anal. Chem. 2010, 82 (13), 5561-5567.

Roy, S.; Ntim, S. A.; Mitra, S.; Sirkar, K. K. Facile fabrication of superior nanofiltration membranes from interfacially polymerized CNT-polymer composites. J. Membr. Sci. 2011, 375 (1-2), 81-87.

Sae-Khow, O.; Mitra, S. Carbon Nanotube Immobilized Composite Hollow Fiber Membranes for Pervaporative Removal of Volatile Organics from water. J. Phys. Chem. C 2010, 114, 16351-16356.

Bhadra, M.; Roy, S.; Mitra, S. Enhanced desalination using carboxylated carbon nanotube immobilized membranes. Sep. & Purif. Technol. 2013, 120, 373-377.

Wijmans, J. G.; Baker, R. W. The solution-diffusion model: a review. J. Membr. Sci. 1995, 107, 1-21.

Dutta, B. K.; Sikdar, S. K. Separation of volatile organic compounds from aqueous solutions by pervaporation using S-B-S block copolymer membranes, Environ. Sci. Technol. 1999, 33, 1709-1716.

Chen, Y.; Iqbal, Z.; Mitra, S. Microwave-Induced Controlled Purification of Single-Walled Carbon Nanotubes without Sidewall Functionalization, Adv. Funct. Mater. 2007, 17, 3946-3951.

Flory, P. J. Principles of Polymer Chemistry. Cornell University Press, Ithaca, N.Y., 1973.

Shafee, E. E.; Naguib, H. F. Water sorption in cross-linked poly(vinyl alcohol) networks. Polymer 2003, 44, 1647-1653.

Roger, C. E. Permeation of gases and vapors in polymers. J. Comyn (Ed.), Polymer Permeability, Elsevier Applied Science, New York, 1985, 32.

Castro, E. F.; Gonzo, E. E.; Gottifredi, J. C. The analysis of sorption data of organic vapors in polymeric membranes through novel theories. J. Membr. Sci. 1996, 113, 57-64.

Xingli Liu & Xiaolan Li & Zhiyong Lu & Xinping Miao & Yujun Feng, Modified acrylic-based superabsorbents with hydrophobic monomers: synthesis, characterization and swelling behaviors. J Polym Res (2011) 18:897-905.

Carlsson, A.; Lindman, B.; Nilsson, P.-G. Hydration of ethyl hydroxyethyl cellulose. Polymer 1986, 27, 431-436.

Qu, X.; Wirsen, A.; Albertsson, A. C. Novel pH sensitive chitosan hydrogels: swelling behavior and states of water. Polymer 2000, 41, 4589-4598.

Bekyarova, E.; Hanzawa, Y.; Kaneko, K.; Silvestre-Albero, J.; Sepulveda-Escribano, A.; Rodriguez-Reinoso, F.; Kasuya, D.; Yudasaka, M.; Iijima, S. Cluster-mediated filling of water vapor in intratube and interstitial nanospaces of single-wall carbon nanohorns. *Chemical Physics Letters* 2002, 366, 463-468.

Verweij, H.; Schillo, M. C.; Li, J. Fast Mass Transport Through Carbon Nanotube Membranes. *Small* 2007, 3, 1996-2004.

Kar, S.; Bindal, R. C.; Tewari, P. K. Carbon nanotube membranes for desalination and water purification: Challenges and opportunities. *Nano Today* 2012, 7, 385-389.

Hu, S. Y.; Zhang, Y.; Lawless, D.; Feng, X. Composite membranes comprising of polyvinylamine-poly(vinyl alcohol) incorporated with carbon nanotubes for dehydration of ethylene glycol by pervaporation. *J. Membr. Sci.* 2012, 417-418, 34-44.

Sajjan, A. M.; Jeevan Kumar, B. K.; Kittur, A. A.; Kariduraganavar, M. Y. Novel approach for the development of pervaporation membranes using sodium alginate and chitosan-wrapped multiwalled carbon nanotubes for the dehydration of isopropanol. *J. Membr. Sci.* 2013, 425-426, 77-88.

Mattia, D.; Leese, H.; Lee, K. P. Carbon nanotube membranes: From flow enhancement to permeability. *J. Membr. Sci.* 2015, 475, 266-272.

What is claimed is:

1. A polymeric membrane comprising a porous substrate and a layer disposed on a surface of the porous substrate, the layer comprising a plurality of carbon nanotubes immobilized in a super-absorbent polymer.

2. The polymeric membrane according to claim 1 wherein the porous substrate comprises a porous polymeric material.

3. The polymeric membrane according to claim 2 wherein the porous substrate is selected from the group consisting of cellulose acetate, cellulose ester, polysulfone, polyether sulfone, polyacrilonitrile, polyamide, polyimide, polyethylene, polypropylene, polytetrafluoroethylene, polyvinylidene fluoride and polyvinylchloride.

4. The polymeric membrane according to claim 1 wherein the porous substrate comprises polypropylene.

5. The polymeric membrane according to claim 1 wherein the porous substrate comprises hollow fiber polypropylene.

6. The polymeric membrane according to claim 1 wherein at least one of the plurality of carbon nanotubes is single walled.

7. The polymeric membrane according to claim 1 wherein at least one of the plurality of carbon nanotubes is multi-walled.

8. The polymeric membrane according to claim 1 wherein at least one of the plurality of carbon nanotubes is carboxylated.

9. The polymeric membrane according to claim 1 wherein the super-absorbent polymer is selected from the group consisting of cross-linked poly(acrylamide-co-acrylic acid) and salts thereof and cross-linked sodium polyacrylate.

10. The polymeric membrane according to claim 1 wherein the super-absorbent polymer is poly(acrylamide-co-acrylic acid).

11. A method of making a carbon nanotube-immobilized membrane comprising the steps of dispersing a plurality of carbon nanotubes in water to form a carbon nanotube dispersion, dissolving a super-absorbent polymer in water to form a super-absorbent copolymer solution, adding the super-absorbent copolymer solution to the carbon nanotube dispersion to form a super-absorbent polymer-carbon nanotube mixture, applying the super-absorbent polymer-carbon nanotube mixture to a surface of a porous substrate and drying the super-absorbent polymer-carbon nanotube mixture.

12. The method according to claim 11 further comprising carboxylating at least one of the plurality of carbon nanotubes.

13. The method according to claim 11 further comprising pre-treating the porous substrate prior to the step of applying the super-absorbent polymer-carbon nanotube mixture thereto to enhance adhesion between the porous substrate and the super-absorbent polymer-carbon nanotube mixture.

14. The method according to claim 13 wherein the porous substrate comprises polypropylene and the step of pre-treating comprises hydrophilization.

15. The method according to claim 14 wherein the hydrophilization step comprises applying chromic acid to the porous substrate.

* * * * *